(12) United States Patent
Ouchi et al.

(10) Patent No.: US 9,902,372 B2
(45) Date of Patent: Feb. 27, 2018

(54) WIPER ARM

(71) Applicant: NIPPON WIPER BLADE CO., LTD., Kazo-shi, Saitama (JP)

(72) Inventors: Katsuhiro Ouchi, Kazo (JP); Yuichi Shiraishi, Kazo (JP)

(73) Assignee: NIPPON WIPER BLADE CO., LTD., Saitama (JP)

( * ) Notice: Subject to any disclaimer, the term of this patent is extended or adjusted under 35 U.S.C. 154(b) by 53 days.

(21) Appl. No.: 14/392,351

(22) PCT Filed: Jun. 24, 2014

(86) PCT No.: PCT/JP2014/066678
§ 371 (c)(1),
(2) Date: Dec. 24, 2015

(87) PCT Pub. No.: WO2014/208541
PCT Pub. Date: Dec. 31, 2014

(65) Prior Publication Data
US 2016/0272156 A1 Sep. 22, 2016

(30) Foreign Application Priority Data

Jun. 28, 2013 (JP) .................................. 2013-137603

(51) Int. Cl.
*B60S 1/34* (2006.01)

(52) U.S. Cl.
CPC ........... *B60S 1/3481* (2013.01); *B60S 1/3436* (2013.01)

(58) Field of Classification Search
CPC ............................ B60S 1/3436; B60S 1/3481

USPC ................... 15/250.351, 250.352, 250.34
See application file for complete search history.

(56) References Cited

U.S. PATENT DOCUMENTS

| 5,894,628 | A | 4/1999 | Egner-Walter et al. |
| 8,205,292 | B1 | 6/2012 | Thielen et al. |
| 2002/0144373 | A1* | 10/2002 | Muramatsu ........... B60S 1/3481 15/250.352 |

(Continued)

FOREIGN PATENT DOCUMENTS

| DE | 4333554 | * 10/1994 |
| DE | 4333554 A1 | 10/1994 |
| DE | 102008034373 A1 | 2/2010 |

(Continued)

*Primary Examiner* — Gary Graham
(74) *Attorney, Agent, or Firm* — Muncy, Geissler, Olds & Lowe, P.C.

(57) ABSTRACT

There is provided a wiper arm including a head cover attached to an arm head and securely preventing the head cover from coming off the arm head. A wiper arm (1) includes an engaging protrusion (19) which extends upward and is disposed on a step section (18) formed at a lower end of a dent section (17) formed on a side surface of an arm head (2), and a protruding engagement section (27) formed near a lower end of an inner surface of a side wall (23) of a head cover (4). An opening section (27A) opening downward is formed in the protruding engagement section (27). The engaging protrusion (19) fits into the opening section (27A) along a vertical direction, namely, a direction along the side wall (23). The open end of the side wall (23) of the head cover (4) is thereby prevented from being widened outward so that the head cover (4) is prevented from coming off the arm head (2).

9 Claims, 9 Drawing Sheets

(56) References Cited

U.S. PATENT DOCUMENTS

2002/0152575 A1* 10/2002 Tsukamoto ........... B60S 1/3481
15/250.352

FOREIGN PATENT DOCUMENTS

| | | |
|---|---|---|
| JP | 4-104753 A | 9/1992 |
| JP | H0872676 A | 3/1996 |
| JP | H 09-510161 A | 10/1997 |
| JP | 2001-247015 A | 9/2001 |
| JP | 2001-301580 * | 10/2001 |
| JP | 2006-281954 * | 10/2006 |
| JP | 2006-281954 A | 10/2006 |
| JP | 2006-298146 A | 11/2006 |
| JP | 2007-062547 A | 3/2007 |
| JP | 2007-512186 A | 5/2007 |
| JP | 2007-261396 A | 10/2007 |
| JP | 2010-076503 A | 4/2010 |

* cited by examiner

WIPER ARM

TECHNICAL FIELD

The present invention relates to a wiper arm provided with a head cover attached to an arm head.

BACKGROUND ART

A wiper arm provided in a wiper device is generally comprised of an arm head and an arm main body which is pivotally attached to the arm head around a connecting shaft. The arm head is a member linked to drive means of the wiper device and includes a connection section to which a drive shaft is connected. Such an arm head can be provided with a head cover which covers the arm head to improve its outer appearance.

Figure 9:
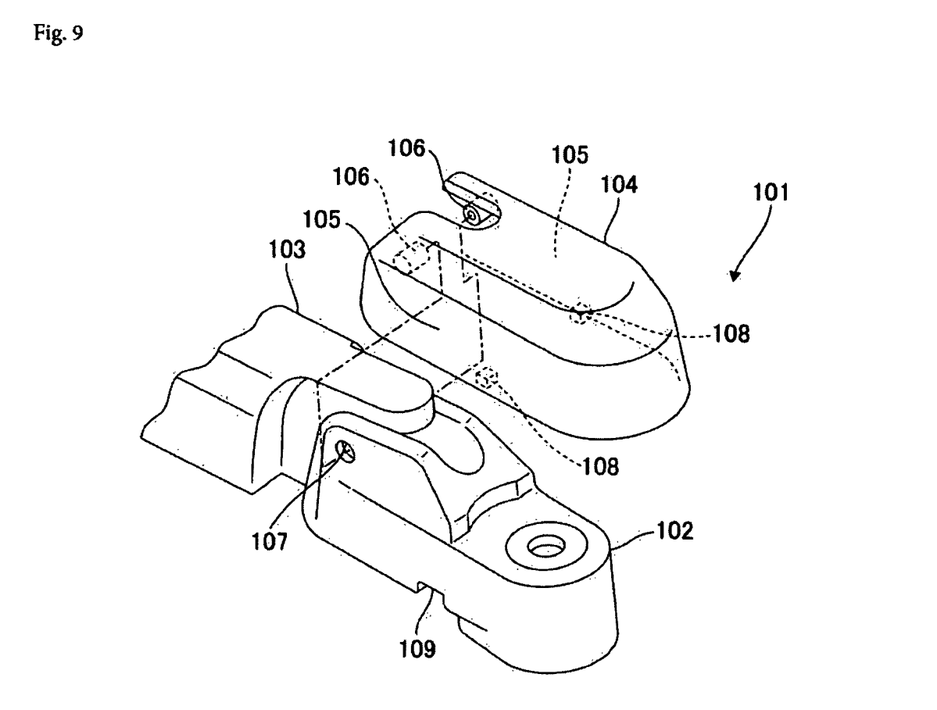
FIG. 9 is a perspective view showing a part of a conventional wiper arm.

FIG. 9 shows a part of such a conventional wiper arm. As shown in the drawing, a wiper arm 101 includes an arm head 102, an arm main body 103 pivotally attached to the arm head 102, and a head cover 104 to be attached to the arm head 102.

Protruding pivot shafts 106 are provided on the inner surfaces of both side walls 105 of the head cover 104. These pivot shafts 106 are fit into shaft holes 107 provided on both side surfaces of the arm head 102. The head cover 104 is thus pivotally attached to the arm head 102 around the pivot shafts 106 and can be selectively positioned between its closed position in which the head cover 104 covers the arm head 102 and in its open position in which the head cover 104 is upright with respect to the arm head 102.

The head cover 104 is also provided with claw sections 108 which are disposed near the lower ends of the inner surfaces of both side walls 105 of the head cover 104 and extend toward the inner side of the head cover 104. When the head cover 104 is in its closed position, these claw sections 108 engage with recessed sections 109 provided on the bottom surface of the arm head 102. The head cover 104 is thus prevented from rotating from its closed position toward its open position.

CITATION LIST

Patent Literature

[PTL1]
Japanese Patent Laid-Open No. 2001-247015

SUMMARY OF INVENTION

Technical Problem

As described above, in the conventional wiper arm 101, the head cover 104 is attached to the arm head 102 by means of the claw sections 108 of the head cover 104 which hold the arm head 102 by grasping the arm head 102 from its bottom surface side. Such claw sections 108 are, however, engaged with the arm head 102 along the lateral direction (in a direction orthogonal to the side wall of the head cover 104), and this results in the following problem. Namely, because the thickness of the side wall 105 of the head cover 104 is relatively thin and is easily deformable, the lower end (the open end) of the side wall 105 may be widened outwardly so that the claw sections 108 are disengaged from the recessed sections 109 and the head cover 104 becomes inclined with respect to the arm head 102. As a result, the head cover 104 may come off the arm head 102.

In view of the foregoing, it is an object of the present invention to provide to a wiper arm including a head cover attached to an arm head and securely preventing the head cover from coming off the arm head.

Solution to Problem

The present invention provides a wiper arm comprising an arm head and a head cover attachable to the arm head, said head cover including a side wall covering a side section of said arm head, said wiper arm including engagement means provided between said arm head and the side wall of said head cover for engagement in a direction along the side wall of said head cover when said head cover is attached to said arm head.

Said engagement means may be provided with an engaging protrusion and a protruding section, said engaging protrusion being disposed on one of said arm head and the side wall of said head cover and extends in the direction along the side wall of said head cover, and said protruding engagement section being disposed on the other of said arm head and the side wall of said head cover and capable of being engaged with said engaging protrusion.

A dent section may be provided on a side wall of said arm head and extends in a direction along which said head cover is attached, and said engaging protrusion may be disposed on a step section formed on the end portion of said dent section.

Said engaging protrusion may include a sloping section sloped with respect to the direction along which said head cover is attached to said arm head.

Said protruding engagement section may include an opening section surrounding the entire of the outer periphery of said engaging protrusion.

A holding section for holding said arm head may be provided on an upper wall of said head cover.

The holding section may be a holding rib disposed on an inner surface of the upper wall of said head cover, and said holding rib may include a recessed holding section into which a part of said arm head is fit when said head cover is attached to said arm head.

Said engagement means may be disposed near the open end of said side wall.

Said head cover may be attached to said arm head to be pivotally rotatable around a pivot shaft.

Said head cover may include a claw section being engaged with the bottom surface of said arm head when said head cover is attached to said arm head.

Said arm head may include a flange section disposed on a side surface of said arm head, and an opening section may be formed on one of said flange section and said side wall of said head cover while an engaging protrusion fitting in said opening section are formed on the other of said flange section and said side wall of said head cover.

Advantageous Effects of Invention

According to the present invention, the wiper arm (for example, a wiper arm 1) includes, between the side wall (for example, a side wall 23, 41) of the head cover (for example, a head cover 4, 40) and the arm head (for example, an arm head 2, 30), the engagement means (for example, an engaging protrusion 19 and a protruding engagement section 27, an opening section 32 and an engaging protrusion 42) which are engaged in the direction along the side wall of the head cover when the head cover is attached to the arm head. Accordingly, the side wall of the head cover is held at a position adjacent to the arm head, and the head cover is effectively prevented from coming off due to the side wall of the head cover being widened outward.

The dent section (for example, a dent section 17) extending in the attachment direction of the head cover may be provided on the side surface of the arm head. The engaging protrusion (for example, the engaging protrusion 19) may be provided on the step section (for example, 18) disposed on the end portion of the dent section. The protruding engagement section (for example, the protruding engagement section 27) may be provided on the inner surface of the side wall of the head cover. Accordingly, the protruding engagement section moves within the dent section when the head cover is attached to the arm head and does not interfere with the side surface of the arm head. The head cover can thus be smoothly attached. Also, the engaging protrusion of the arm head and the protruding engagement section of the head cover may be arranged on the head cover, and thus it is not necessary to change the outer appearance and shape of the head cover. Therefore, a wiper arm from which the head cover does not easily come off can be obtained without changing the outer appearance of the wiper arm.

The sloping section (for example, a sloping section 19A) sloped in the attachment direction of the head cover may be provided to the engaging protrusion. Accordingly, the engaging protrusion does not interfere with the peripheral portion of a part where the engaging protrusion of the protruding engagement section fits (for example, an edge portion of an opening section 27A) when the head cover is attached so that the head cover can be smoothly attached.

The opening section (for example, the opening section 27A) surrounding the entire of the outer periphery of the engaging protrusion may be provided on the protruding engagement section. Accordingly, the engaging protrusion is stably held inside the opening section, and the head cover may be more reliably prevented from coming off due to the side wall of the head cover being widened outward.

The holding section (for example, a holding rib 28) for holding a part of the arm head may be provided on the upper wall of the head cover. Accordingly, the head cover is held correctly arranged with respect to the arm head. The head cover is thus doubly held by means of the holding section and the engagement means so that coming off of the head cover is more reliably prevented.

The holding section may be a holding rib (holding rib 28) provided on the inner surface of the upper wall of the head cover, and a part of the wiper arm (for example, an upper end portion of an arm section 12) may be fit into the recessed holding section (for example, a recessed holding section 28B) of the holding rib. Accordingly, the holding section is arranged inside the head cover so that it is not necessary to change the outer appearance and shape of the head cover.

The engagement means may be provided near the open end of the side wall of the head cover (for example, the lower end of the side wall 23). Accordingly, the side wall of the head cover can be reliably prevented from being widened outward at the open end.

DESCRIPTION OF EMBODIMENTS

The present invention will now be described, by way of example, with reference to the accompanying drawings.

Figure 1:
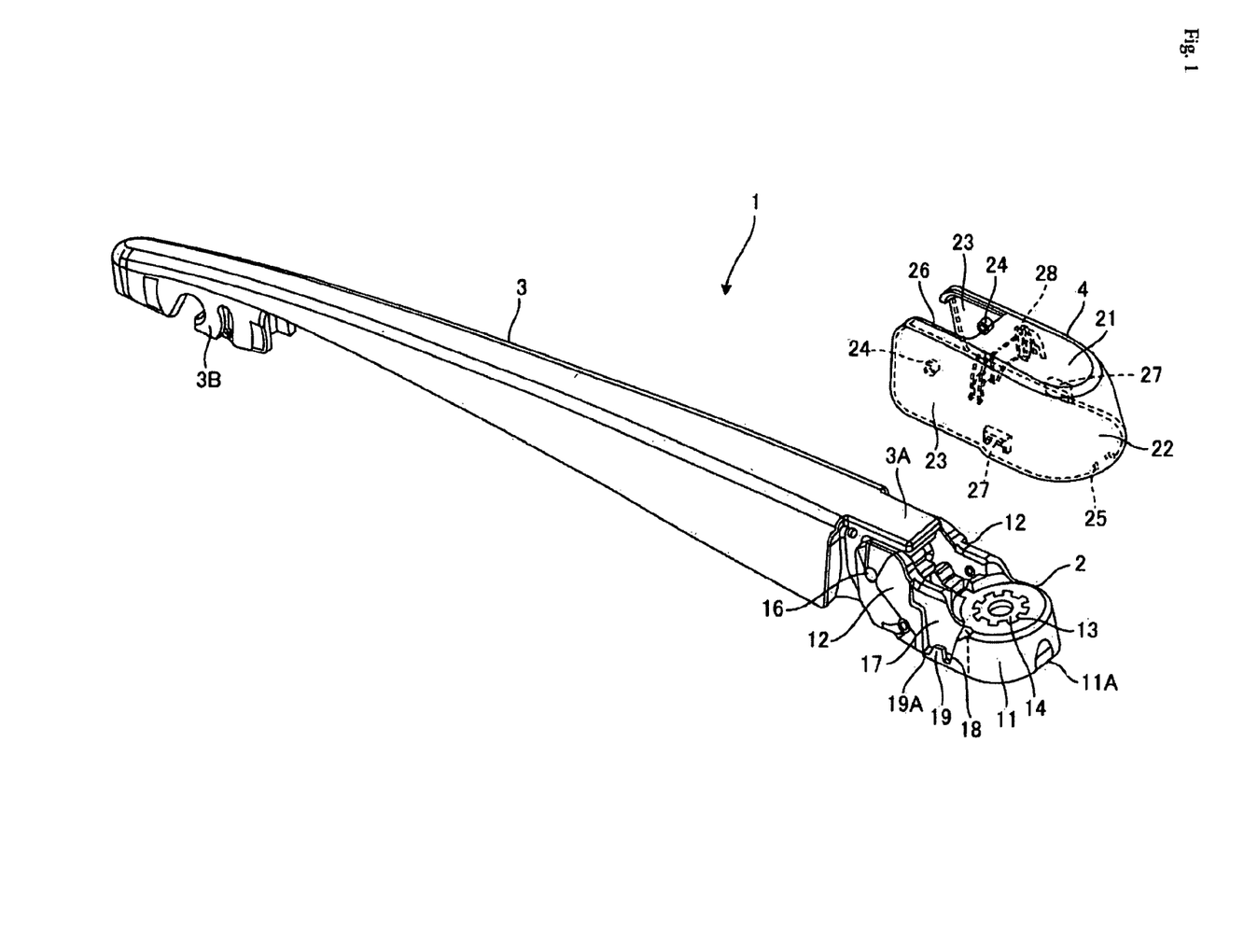
FIG. 1 is a perspective view showing the overall structure of a wiper arm according to a first embodiment of the present invention.
Figure 2:
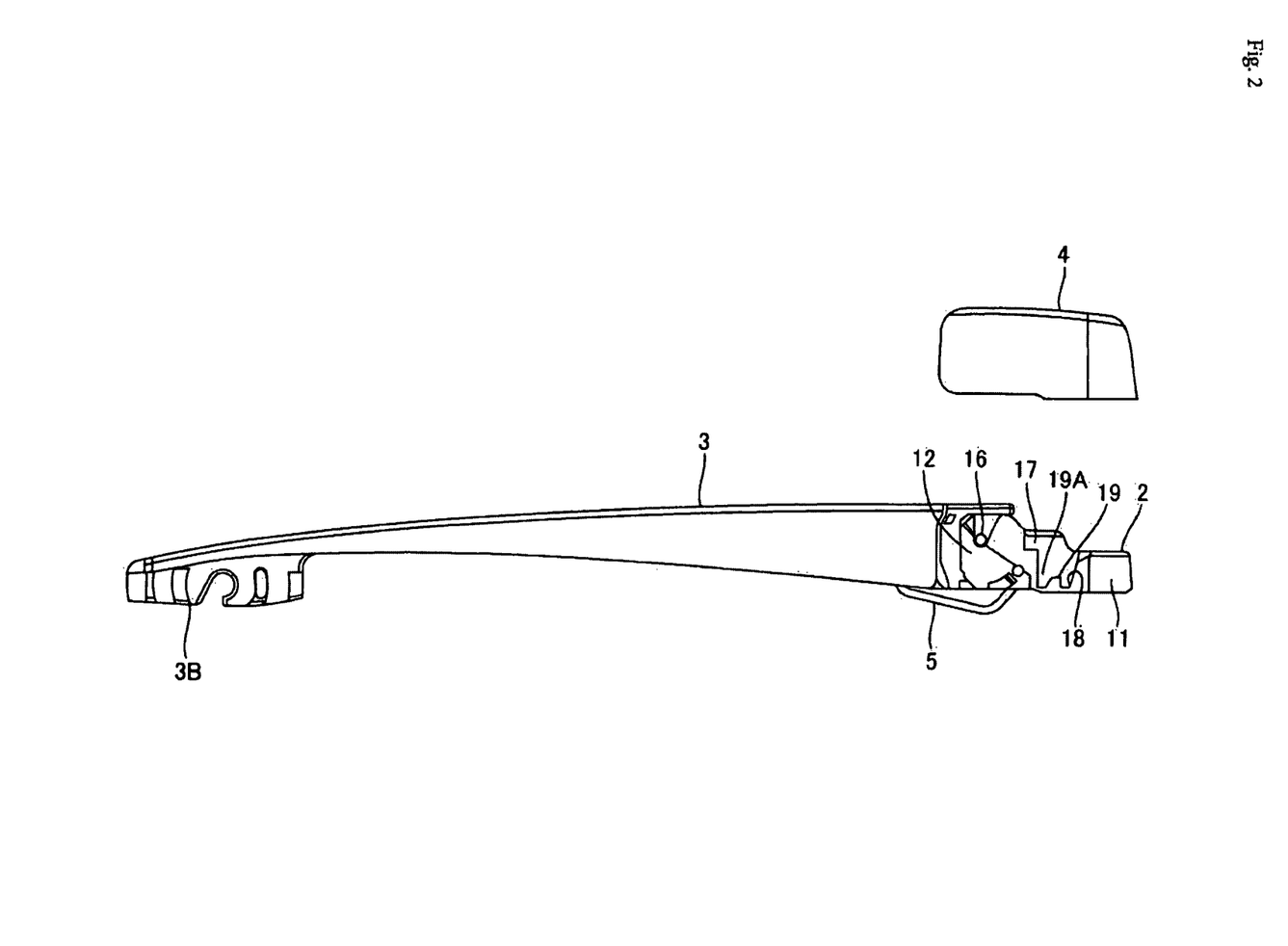
FIG. 2 is a side view likewise showing the overall structure of the wiper arm in which a head cover is removed.
Figure 3:
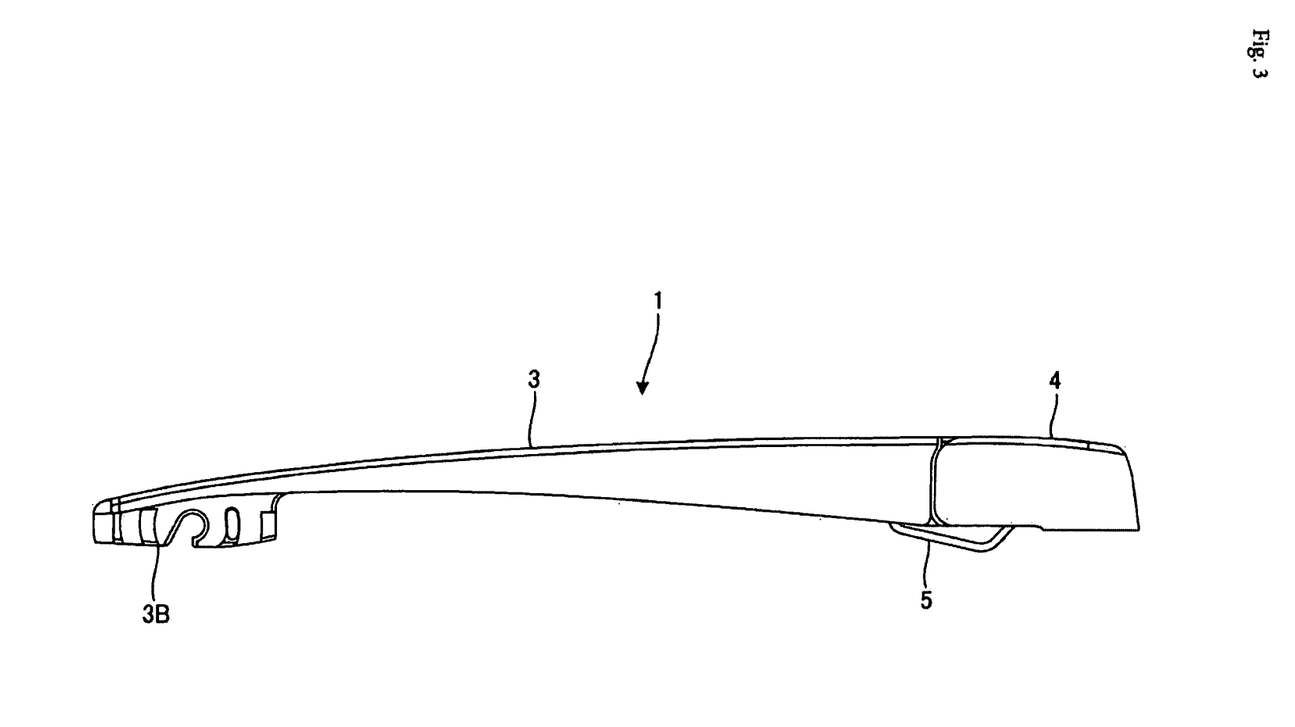
FIG. 3 is a side view showing the overall structure of the wiper arm in which the head cover is attached.

FIGS. 1 to 3 show the overall structure of a wiper arm 1 according to a first embodiment of the present invention. As shown in the drawings, the wiper arm 1 includes an arm head 2, an arm main body 3, and a head cover 4. In the present embodiment, each of the arm head 2, the arm main body 3 and the head cover 4 is almost entirely formed by monolithic molding of resin.

Figure 4:
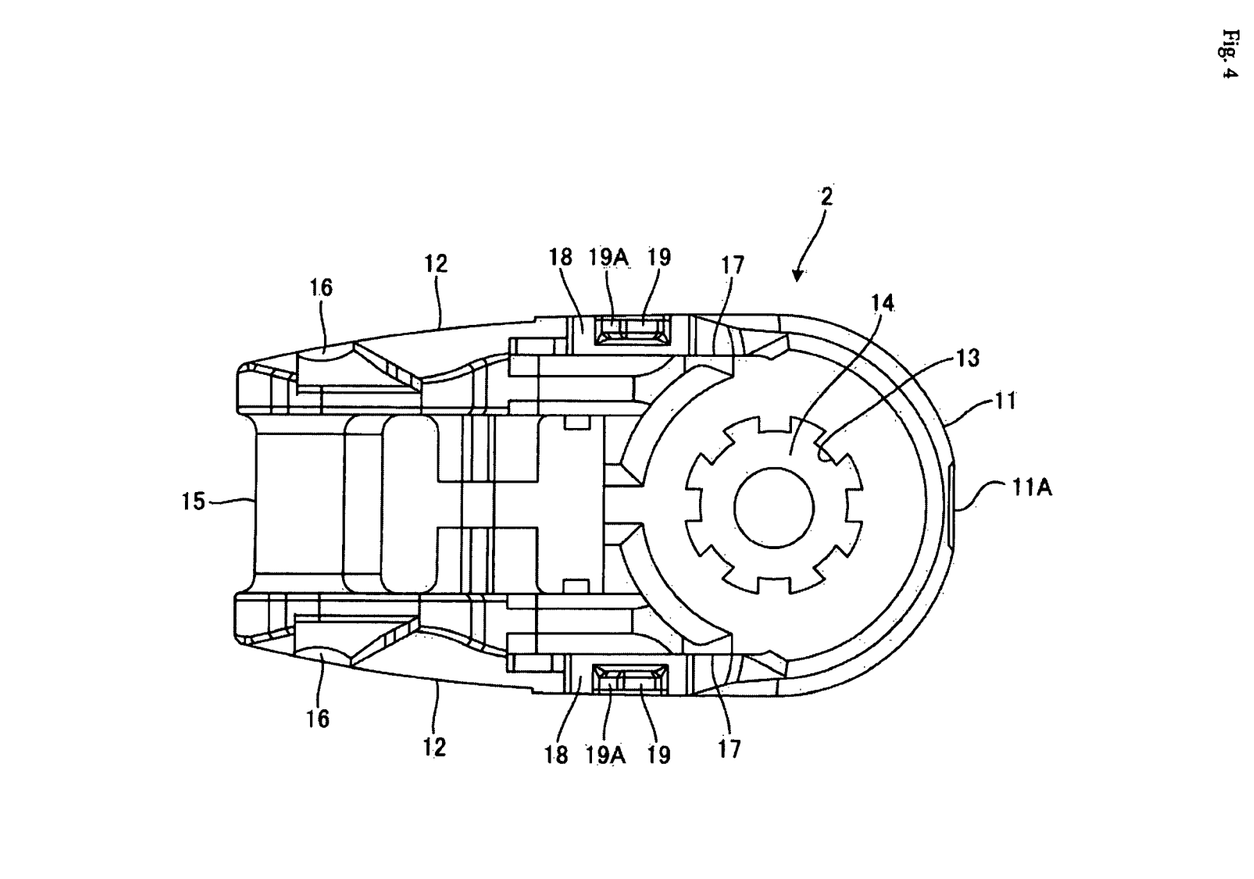
FIG. 4 is a plan view of an arm head.

The arm head 2 is a member forming a base end portion of the wiper arm 1 and, as shown in more details in FIG. 4, includes a base end section 11 and a pair of left and right arm sections 12. The base end section 11 has a substantially columnar shape and includes a drive shaft hole 13 penetrating the center axis of the columnar shape in the vertical direction. A metal bearing 14 is fixed to the drive shaft hole 13. A drive shaft of a drive mechanism (drive motor), not shown, is fixed to the bearing 14 so that the wiper arm 1 can be driven by the drive mechanism.

A recessed section 11A is formed in the bottom surface of a rear end section of the base end section 11. As will be described later, when the head cover 4 is in its closed position of covering the arm head 2, a claw section 25 of the head cover 4 is engaged with the recessed section 11A.

The pair of arm sections 12 extends from both the left and right sides of the base end section 11 toward the arm main body 3 and forms side wall portions of the arm head 2. A connecting shaft 15 extends between the pair of arm sections 12, and a base end section 3A of the arm main body 3 is pivotally attached to the connecting shaft 15. The arm main body 3 is thus connected to the arm head 2 and is capable of rotating around the connecting shaft 15.

A pivot shaft hole 16 is formed in the outer surface of each arm section 12 of the arm head 2. A pivot shaft 24 of the head cover 4 is fit into the pivot shaft hole 16 so that the head cover 4 is pivotally attached to the pivot shaft 24. In this case, the pivot shaft hole 16 is formed at a predetermined position on a tip end side (on the side facing the arm main body 3) of the arm section 12 so that a back wall 22 side of the head cover 4 is movable between its open and close positions.

A dent section 17 is formed on the outer surface of each arm section 12 and is disposed near the substantially center portion in the longitudinal direction of the arm head 2 so as to extend from the upper end to near the lower end of the arm section 12. The engaging protrusion 19 is provided on the step section 18 formed on the lower end of the dent section 17 and extends upwardly.

The engaging protrusion 19 is a plate member having a trapezoid shape, and its front side (the side facing the pivot shaft hole 16) is a sloping section 19A which is sloped away from the shaft hole 16 as it gets nearer to the upper side of the trapezoid.

The arm main body 3 is a long member extending toward the tip end side of the wiper arm 1. A connection section 3B is formed at the tip end side of the arm main body 3 so that a wiper blade (not shown) can be connected to the connection section 3B.

A spring 5 is disposed between the arm main body 3 and the arm head 2. The spring 5 is constructed to apply a predetermined biasing force for pivoting of the arm main body 3 around the arm head 2. Specifically, when using the wiper arm 1 (during wiping operation of the wiper device), the spring 5 acts to generate a pressing force to press the wiper blade held by means of the wiper arm 1 against the surface to be wiped (for example, glass surfaces of a vehicle). When the arm main body 3 is in its upright position with respect to the arm head 2 (positioned in a so-called locked-back state), the spring 5 acts to hold the arm main body 3 in its upright position.

The head cover 4 is a box-shaped member attached to the arm head 2 from above side. As shown in more details in FIG. 5, the head cover 4 includes an upper wall 21, a back wall 22 and both side walls 23. An open end is formed in the lower end sides of the back wall 22 and the side walls 23. When the head cover 4 is attached to the arm head 2, the arm head 2 is contained within a space surrounded by the upper wall 21, the back wall 22 and the side walls 23 so that the upper side and the side surface of the arm head 2 (the circumferential surface of the base end section 11 and the arm sections 12) are covered.

Figure 5:
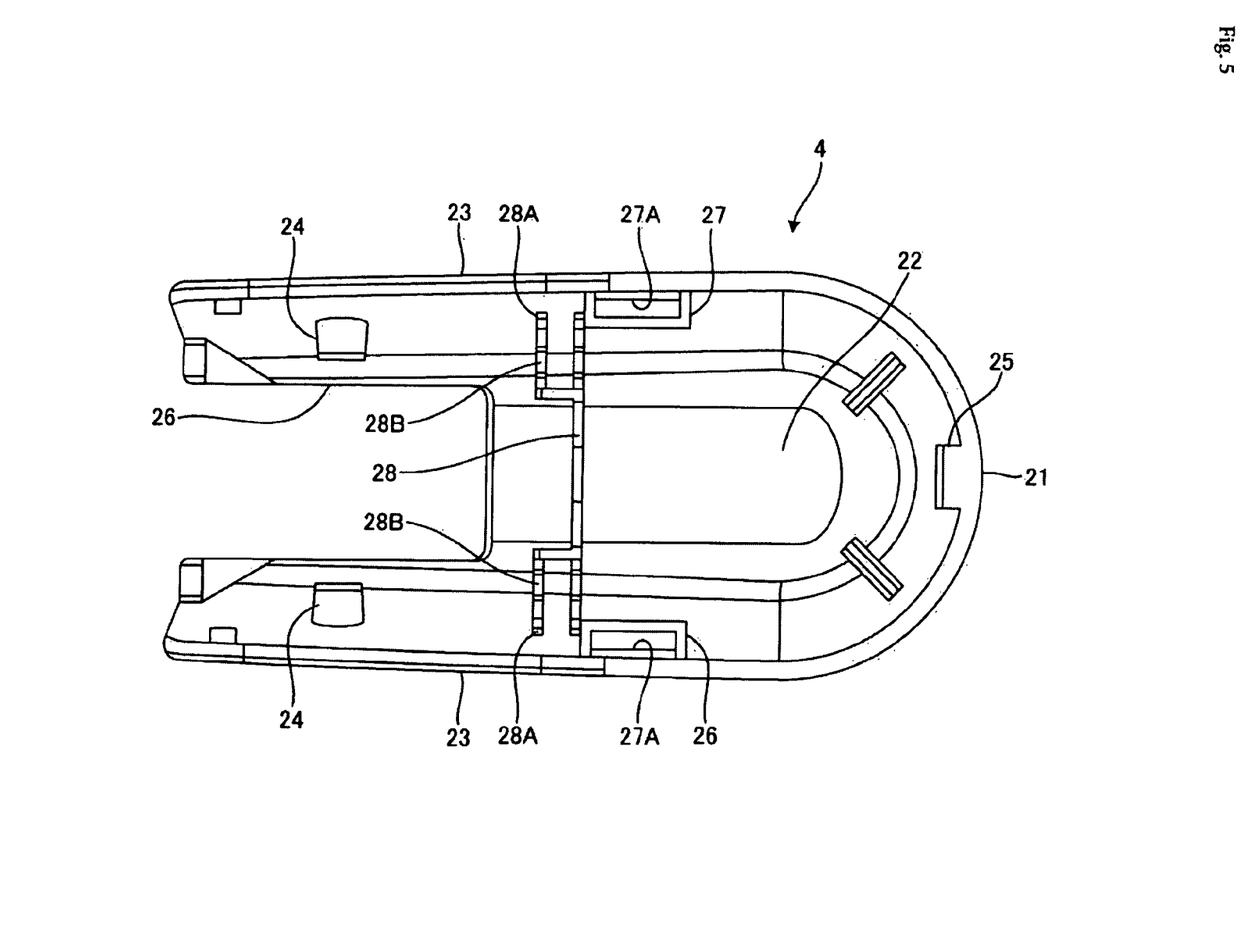
FIG. 5 is a bottom view of the head cover.

The protruding pivot shaft 24 is formed on each of the side walls 23 of the head cover 4 and positioned near the front end of the inner surface. As described above, the pivot shafts 24 on both sides is fit into the corresponding pivot shaft holes 16 formed on the arm sections 12 of both sides of the arm head 2 so that the head cover 4 is connected to the arm head 2 and is capable of pivoting around the pivot shafts 24. The head cover 4 can be thus movable between its closed position in which the head cover 4 is attached to the arm head 2 and covers the arm head 2 and its open position in which the head cover 4 is upright with respect to the arm head 2 and the arm head 2 is exposed.

A claw section 25 is formed at the lower end (open end) of the back wall 22 of the head cover 4 and extends frontward (toward the inner side of the head cover 4). When the head cover 4 is positioned in its closed position, the claw section 25 is engaged with the engagement section 11A formed on the rear end of the bottom surface of the arm head 2. A pivoting operation of the head cover 4 from it closed position toward its open position is prevented by the engagement of the claw section 25 with the engagement section 11A, and the head cover 4 is held in its closed position.

A cut-away section 26 is provided on the front side (on the side facing the arm main body 3) of the upper wall 21 of the head cover 4. The base end section 3A of the arm main body 3 is arranged within the cut-away section 26. Accordingly, each of the arm main body 3 and the head cover 4 can be pivoted around the arm head 2 without interfering with each other.

Protruding engagement sections 27 are formed in near the lower end (open end) of the inner surfaces of the side walls 23 on both sides of the head cover 4. The protruding engagement section 27 includes an opening section 27A, which is open downward and whose cross section is rectangular. When the head cover 4 is attached to the arm head 2, the engaging protrusion 19 of the arm head 2 fits into the opening section 27A. In the present embodiment, a combination of the engaging protrusion 19 of the arm head and the protruding engagement section 27 (opening section 27A) of the head cover 4 forms the engagement means in the claims.

A protruding holding rib 28 is formed on the inner surface of the upper wall 21 of the head cover 4 to extend across the longitudinal direction of the wiper arm 1. Both of the left and right sides of the holding rib 28 forms two branched sections 28A. Recessed holding sections 28B facing downward are formed in the branched sections 28A. Accordingly, when the head cover 4 is attached to the arm head 2, the upper end portions of the arm sections 12 on both sides of the arm head 2 are fit into the corresponding recessed holding sections 28B.

With the construction described above, as shown in FIG. 6, when the head cover 4 is attached to the arm head 2 (when the head cover 4 is in its closed position), the engaging protrusions 19 of the arm head 2 are fit into the opening sections 27A of the protruding engagement sections 27 along the vertical direction (that is, the direction along the side walls 23 of the head cover 4). The engaging protrusions 19 are thereby held (locked) inside the opening sections 27A of the protruding engagement sections 27 and are prevented from moving in the lateral direction (that is, the direction of deformation of the side walls 23 of the head cover 4). Accordingly, the side walls 23 of the head cover 4 are held at positions adjacent to the side surfaces of the arm head 2 by the engagement of the engaging protrusions 19 and the protruding engagement sections 27. The lower end (open end) of the side walls 23 is thus prevented from widening outward (in a direction away from the side surfaces of the arm head 2), and the head cover 4 can be effectively prevented from coming off the arm head 2.

Figure 6:
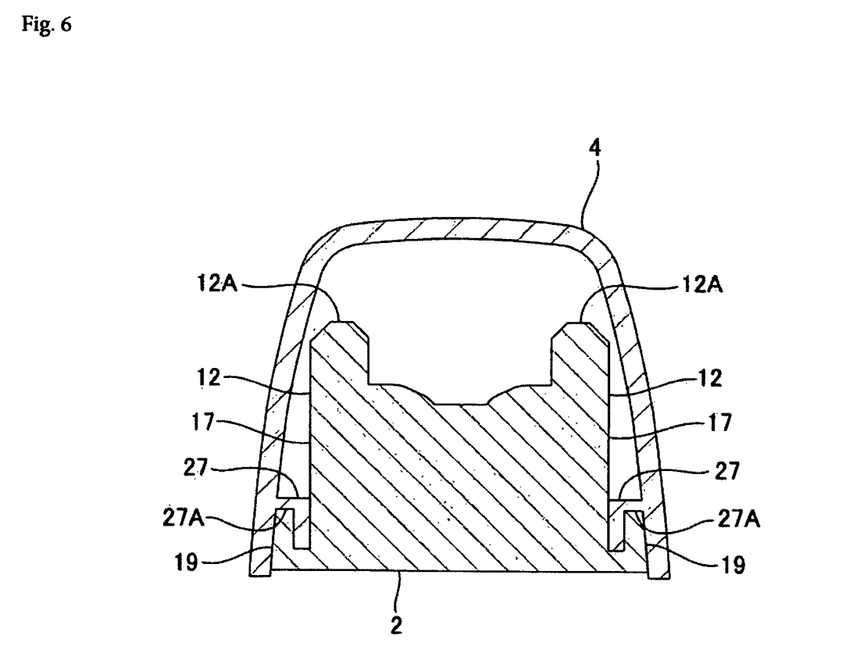
FIG. 6 is a cross-sectional view of the wiper arm, showing a cross section of a protruding engagement section of the head cover.

Since the sloping sections 19A sloped with respect to the vertical direction (that is, the attachment direction of the head cover 4) are provided on the engaging protrusions 19, when the head cover 4 is attached to the arm head 2, the engaging protrusions 19 are fit into the opening sections 27A of the protruding engagement sections 27 without interfering with the edge portions of the opening sections 27A. The open and close operation of the head cover 4 can thereby be performed smoothly.

Because the dent sections 17 extending in the vertical direction (the attachment direction of the head cover 4) are provided on the side surfaces of the arm head 2, when mounting the head cover 4 (during open and close operation), the protruding fitting sections 27 of the head cover 4 move inside the dent sections 17 and do not interfere with the side surfaces of the arm head 2. Accordingly, the head cover 4 can be smoothly mounted on the arm head 2.

The opening sections 27A of the protruding engagement sections 27 have rectangular cross sections and thus hold the engaging protrusions 19 so as to surround the entire periphery of the engaging protrusions 19. Accordingly, the engaging protrusions 19 are stably held within the opening sections 27A, and the head cover 4 is stably kept being correctly attached to the arm head 2.

Figure 7:
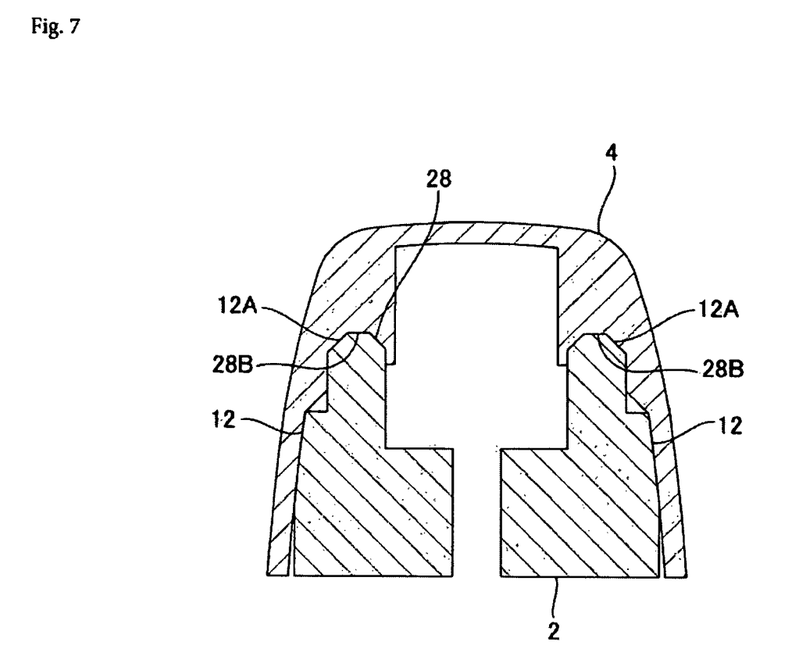
FIG. 7 is a cross-sectional view of the wiper arm, showing a cross section including a holding rib of the head cover.

As shown in FIG. 7, when the head cover 4 is attached to the arm head 2, the upper end portions of the arm sections 12 of the arm head 2 are fit into the recessed holding sections 28B, and the holding ribs 28 securely hold the arm head 2. Accordingly, the head cover 4 is maintained in its correct attitude with respect to the arm head 2 and is appropriately prevented from being inclined and coming off the arm head 2.

As described above, according to the wiper arm 1 of the present embodiment, since the engaging protrusions 19 of the arm head 2 fit into the protruding engagement sections 27 provided near the lower end of the side walls 23 of the head cover 4 along the vertical direction (the direction along the side walls 23), the lower end (open end) of the side walls 23 of the head cover 4 is securely attached to the side surfaces of the arm head 2 with respect to the lateral direction. Accordingly, the open end of the side walls of the head cover 4 is not widened outward with respect to the arm head 2, and the head cover 4 can thus be effectively prevented from coming off the arm head 2.

In addition to the engagement of the engaging protrusions 19 and the protruding engagement sections 27, the arm head 2 is also held by the holding ribs 28. The head cover 4 is thus held at an appropriate position with respect to the arm head 2. Accordingly, the head cover 4 is doubly prevented from coming off the arm head 2 and is stably maintained in a position where the head cover 4 is correctly attached to the arm head 2.

Since the structures for preventing the head cover 4 from coming off the arm head 2. In other words, the engaging protrusions 19, the protruding engagement sections 27 and the holding ribs 28 are all arranged inside the head cover 4. The outer appearance of the head cover 4 is thus not changed due to these structures. Accordingly, the head cover 4 which can be reliably prevented from coming off is achieved without changing the outer appearance of the wiper arm 1.

Figure 8:
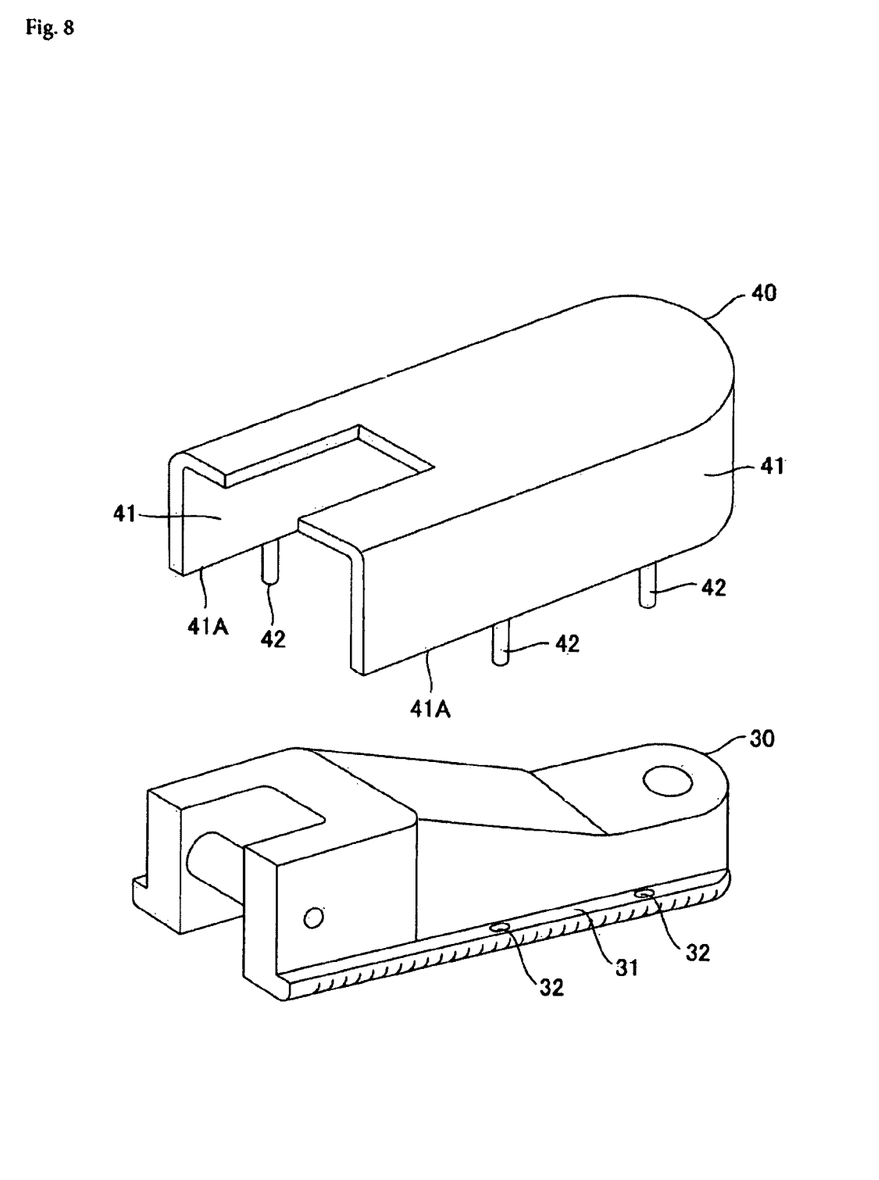
FIG. 8 is a perspective view showing an arm head and a head cover of a wiper arm according to a second embodiment of the present invention.

FIG. 8 shows a part of a wiper arm according to a second embodiment of the present invention. As shown in the drawing, in the present embodiment, an arm head 30 includes flange sections 31 at outer peripheral portions of its lower end sections. A plurality of opening sections 32 opened upward are formed in the flange sections 31. A head cover 40 is capable of being attached to the arm head 30 from above. A plurality of engaging protrusions 42 are formed on lower end sections 41A of side walls 41 of the head cover 40 and are arranged at positions corresponding to the positions of the fitting holes 32 of the arm head 30. In the present embodiment, a combination of the opening section 32 of the arm head 30 and the engaging protrusion 42 of the head cover 40 forms the engagement means in the claims.

With this constructions, when the head cover 40 is attached to the arm head 30, the engaging protrusions 42 on the lower end of the side walls 41 of the head cover 40 are fit into the opening sections 32 formed in the flange sections 31 of the arm head 30. The side walls 41 of the head cover 40 are thereby fixed at the lower end sections 41A so as not to not move sideward (in the lateral direction) with respect to the arm head 30. Accordingly, the head cover 40 can be effectively prevented from coming off the arm head 30 due to the lower end sections 41A of the side walls 41 of the head cover 40 being widened outward.

Although, in the foregoing embodiments, the specific locking means are described as examples, the engagement means of the present invention is not limited to the locking means described in the foregoing embodiments. Namely, the locking means of the present invention may adopt various constructions as long as the locking means engage in the direction along the side wall of the head cover and prevent the side wall from widening (deforming) outward. For example, the attachment direction of the engagement means is not limited to the vertical direction as long as the direction is along the side wall of the head cover.

The engagement means need not be constructed from the engaging protrusion and the opening section. For example, a locking piece extending along the side wall of the head cover can be provided on both sides of the arm head and the head cover so that locking pieces of the both side overlap and be engaged with each other.

LIST OF REFERENCE NUMERALS 1 wiper arm
2 arm head
3 arm main body
4 head cover
11 base end section of arm head
12 arm section of arm head
13 drive shaft hole of arm head
14 bearing of arm head
15 connecting shaft of arm head
16 pivot shaft hole of arm head
17 recessed section of arm head
18 step section of arm head
19 engaging protrusion of arm head
19A sloping section of engaging protrusion
21 upper wall of head cover
22 back wall of head cover
23 side wall of head cover
24 pivot shaft of head cover
25 claw section of head cover
26 cut-away section of head cover
27 protruding engagement section of head cover
27A opening section of protruding engagement section
28 holding rib of head cover
28A branched section of holding rib
28B recessed holding section of holding rib
30 arm head
31 flange section of arm head
32 opening section of arm head
40 head cover
41 side wall of head cover
41A lower end section of side wall
42 engaging protrusion of head cover

The invention claimed is:

1. A wiper arm comprising an arm head and a head cover attachable to the arm head, said head cover including a side wall covering a side section of said arm head, said wiper arm including engagement means provided between said arm head and the side wall of said head cover for engagement in a direction along the side wall of said head cover when said head cover is attached to said arm head;
   wherein said engagement means is provided with an engaging protrusion and a protruding engagement section, said engaging protrusion being disposed on one of said arm head and the side wall of said head cover and extending in a direction along the side wall of said head cover, and said protruding engagement section being disposed on the other of said arm head and the side wall of said head cover and capable of being engaged with said engaging protrusion,
   wherein said engagement means is disposed near an open end of the side wall,
   wherein said protruding engagement section is disposed near an open end of said side wall,
   wherein said engaging protrusion includes an outer periphery, and
   wherein said protruding engagement section includes an opening section surrounding the entire of the outer periphery of said engaging protrusion.

2. The wiper arm according to claim 1, wherein a dent section is provided on a side wall of said arm head and extends in a direction along which said head cover is attached, wherein said dent section include an end portion, and wherein said engaging protrusion is disposed on a step section formed on the end portion of said dent section.

3. The wiper arm according to claim 2, wherein said engaging protrusion includes a sloping section sloped with respect to the direction along which said head cover is attached to said arm head.

4. The wiper arm according to claim 1, wherein said engaging protrusion includes a sloping section sloped with respect to the direction along which said head cover is attached to said arm head.

5. The wiper arm according to claim 1, wherein a holding section for holding said arm head is provided on an upper wall of said head cover.

6. The wiper arm according to claim 5, wherein the holding section is a holding rib disposed on an inner surface of the upper wall of said head cover, and wherein said holding rib includes a recessed holding section into which a part of said arm head is fit when said head cover is attached to said arm head.

7. The wiper arm according to claim 1, wherein said head cover is attached to said arm head to be pivotally rotatable around a pivot shaft.

8. The wiper arm according to claim 1, wherein said head cover includes a claw section being engaged with the bottom surface of said arm head when said head cover is attached to said arm head.

9. The wiper arm according to claim 1, wherein said arm head includes a flange section disposed on a side surface of said arm head, wherein said flange section is the protruding engagement section of said engaging means, and wherein an opening section is formed on said flange section while said engaging protrusion fitting in said opening section are formed on said side wall of said head cover.

\* \* \* \* \*